No. 756,914. PATENTED APR. 12, 1904.
W. D. TUCKER.
HYDROCARBON BURNER.
APPLICATION FILED JULY 21, 1903.
NO MODEL.
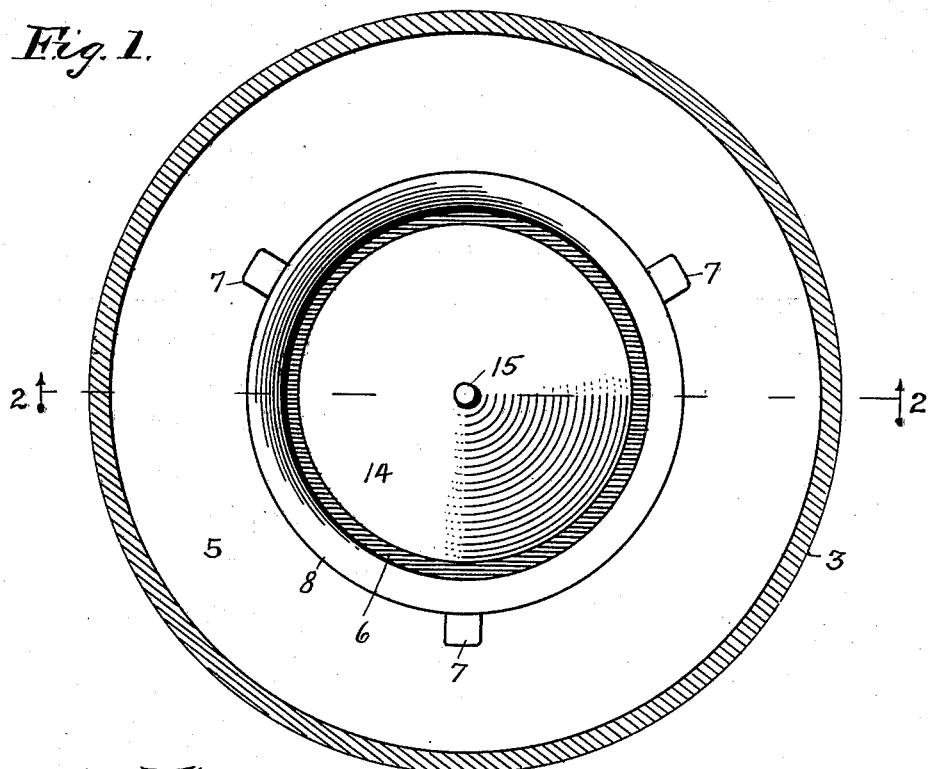
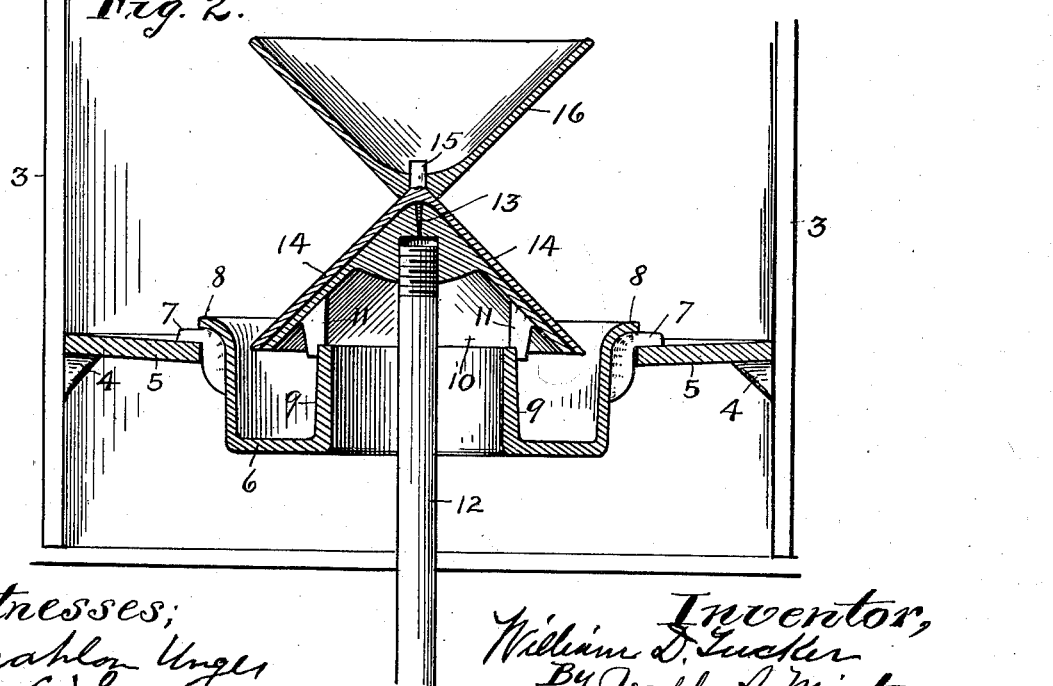

No. 756,914.

Patented April 12, 1904.

UNITED STATES PATENT OFFICE.

WILLIAM D. TUCKER, OF ANDERSON, INDIANA.

HYDROCARBON-BURNER.

SPECIFICATION forming part of Letters Patent No. 756,914, dated April 12, 1904.

Application filed July 21, 1903. Serial No. 166,421. (No model.)

*To all whom it may concern:*

Be it known that I, WILLIAM D. TUCKER, a citizen of the United States, residing at Anderson, in the county of Madison and State of Indiana, have invented certain new and useful Improvements in Hydrocarbon-Burners, of which the following is a specification.

This invention relates to improvements in hydrocarbon-burners; and the object of the invention is to provide a burner capable of burning crude petroleum without becoming clogged from the gummy by-products of the oil.

The object also is to provide a burner that is capable of ready dismemberment for convenience in cleaning or renewal of any of its parts and to provide a device that is simple and easy of operation, inexpensive to manufacture, and durable.

I accomplish the objects of the invention by the mechanism illustrated in the accompanying drawings, in which—

Figure 1 is a top plan view of my improved burner in operative position in a heating-stove, the latter being shown in horizontal section and the spreader attachment of my burner being removed; and Fig. 2 is a vertical section on the line 2 2 of Fig. 1 with the addition of the spreader to the showing as made in Fig. 1.

Like characters of reference indicate like parts throughout both views of the drawings.

3 represents a heating-stove of any usual and suitable construction, having inside lugs 4 to support the annular plate 5. 6 is a drip-pan which is suspended in the central opening of the ring 5 by means of the radial fingers 7. The diameter of the pan is considerably less than the diameter of the ring-opening in order to provide an air-draft between the pan and ring, and the finger-bodies are extended radially to act as centering-pieces to hold the pan in the center of the ring-opening. The outer rim 8 of the pan will preferably be curved outwardly over the fingers 7, as shown in Fig. 2.

The center of the pan 6 will be perforated to form a center-draft passage-way, and leakage from the pan therethrough will be prevented by the upwardly-extended annular flange 9. Mounted above flange 9 is the conical hood 10, having the under side lugs 11, which rest upon the top of flange 9 and form supporting-legs for said hood. As will be noted from Fig. 2, there is an air-space between the hood and the flange and between the hood and the sides of the pan.

Screwed into the thickened apex of the cone from the under side is the oil-supply pipe 12, and discharging through the apex from said pipe is the conduit 13.

Resting upon and covering the hood 10 is the hollow conical shell 14. Oil issuing through conduit 13 flows between the hood and shell and is directed by the latter to the bottom of the hood, where it is ignited. The heat from this ignition raises the shell to a high temperature and volatilizes the oil flowing down between it and the hood. Any excess, however, is caught in the drip-pan 6, and the ignition of a suitable supply of oil accumulated in the pan heats the shell and hood sufficiently at the first lighting of the burner to start the generation of hydrocarbon vapor.

Mounted on pin 15 at the top of shell 14 is the deflector 16, which is a hollow inverted cone, the purpose of which is to spread the flame and heat issuing from the bottom of the shell.

It will be noted that the deflector is readily removed from the shell 14, the latter from the hood 10, the latter from the drip-pan, the pan from the annular plate 5, and the latter from the stove, so that all of the parts are readily separable for cleaning and renewal.

Having thus fully described my invention, what I claim as new, and wish to secure by Letters Patent, is—

1. The combination with a stove, of a plate located transversely, in said stove, said plate having a central opening and forming an air cut-off except through said central opening, a drip-pan of less diameter than the diameter of the plate-opening, held in said opening so as to provide air-passages between the pan and plate, said drip-pan having a central opening and an upward flange surrounding said opening, a conical hood mounted in the pan over said flange, but sufficiently remote to provide an air-passage between said hood and flange, said hood having an oil-exit at its apex, and a conical shell resting upon and covering the hood and causing the oil to flow from the apex to the bottom of the hood.

2. The combination with a stove, of a transverse plate located therein, said plate having a central opening whereby the air is cut off except through said opening, a drip-pan of less diameter than the diameter of the opening in said plate, suspended and held in said opening so as to provide air-passage between pan and plate, said pan having a central opening a raised surrounding flange, a conical hood supported in the pan above the central flanged opening said hood having an oil-opening at its apex, a supply-pipe discharging through said oil-opening, a conical shell resting upon said hood and an inverted conical deflector removably secured to the shell.

3. The combination with a stove, of a transverse ring located therein, said ring having a central opening which forms the only air-passage through the ring, a pan mounted loosely in said opening so as to have a surrounding air-passage, said pan having a center-draft opening, a hood over said center-draft opening having an oil-exit at its top, a shell surrounding and resting upon the hood to deflect the oil to the bottom of the hood, and a deflector secured to the outside of the shell.

In witness whereof I have hereunto set my hand and seal, at Anderson, Indiana, this 10th day of July, A. D. 1903.

WILLIAM D. TUCKER. [L. S.]

Witnesses:
JOHN R. SHONELIGH,
MADELINE LEETGE.